Sept. 5, 1950  A. C. SAMPLE  2,521,257
SELF-LOCKING NUT FOR NOTCHED BOLTS
Filed July 11, 1946

INVENTOR.
Aaron C. Sample
BY Victor J. Evans & Co.
ATTORNEYS

Patented Sept. 5, 1950

2,521,257

UNITED STATES PATENT OFFICE 2,521,257

SELF-LOCKING NUT FOR NOTCHED BOLTS

Aaron C. Sample, Seattle, Wash.; Lillian M. Sample administratrix of said Aaron C. Sample, deceased Application July 11, 1946, Serial No. 682,862

1 Claim. (Cl. 151—11)

This invention relates to a nut and more especially to a self locking nut for a bolt or the like.

The primary object of the invention is the provision of a nut of this character, wherein the bolt or the like threads therein are partially sheared and bent inwardly at a disrupted angle to the remaining threads, for ratchet latching action with the bolt or the like to hold these locked with each other when threaded together and thus eliminating the loosening of either one or the other.

Another object of the invention is the provision of a nut of this character, wherein it can be readily and conveniently applied to a bolt or the like and when worked home thereon these will be locked to each other, so that neither can become accidentally loose or detached one from the other.

A further object of the invention is the provision of a nut of this character, which is simple in construction, thoroughly reliable and efficient in operation, strong, durable, readily and easily applied, it being a single unit and is inexpensive to manufacture and install.

With these and other objects in view the invention consists in the features of construction, combination and arrangement of parts as will be hereinafter more fully described, illustrated in the accompanying drawing, which discloses the preferred embodiment of the invention and pointed out in the claim hereunto appended.

In the accompanying drawing.

Similar reference characters, indicate corresponding parts throughout the several views in the drawing.

Figure 1:
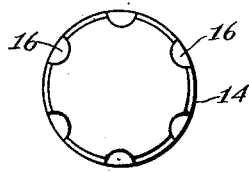
Figure 1 is an end view of the shank of a bolt constructed in accordance with the invention.
Figure 2:
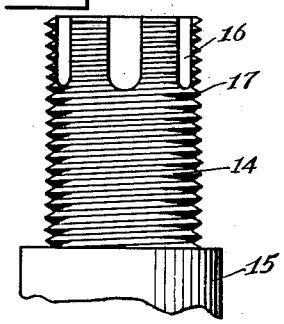
Figure 2 is a fragmentary side view thereof.
Figure 3:
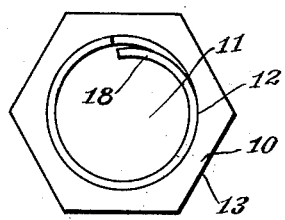
Figure 3 is a plan view of the nut.

Referring to the drawing in detail, the nut constituting the present invention, comprises a collar like body 10, having a central threaded opening 11 there through, the threads for a major extent thereof being indicated at 12, while the exterior of this body has wrench engaging faces 13, as usual.

The opening 11 is adapted to accommodate the shank 14 of a bolt or the like, a portion being identified at 15. This shank 14 concentric to the outer end thereof is provided with spaced longitudinally directed concaved notches 16 which open through the outer end and intersect the threads 17 on such shank for the threads 12 in the nut, so that these can be connected together in the ordinary well known manner.

Figure 4:
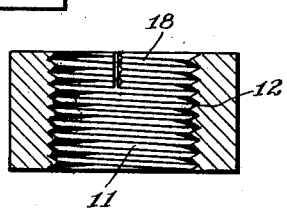
Figure 4 is a sectional view taken transversely of the nut.
Figure 5:
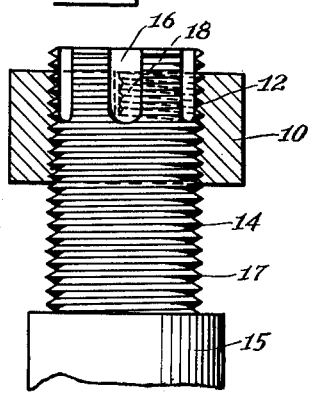
Figure 5 is a side view of the bolt and nut connected together, the nut being in vertical section.

The body 10 has partially sheared therefrom without detachment a grouped number of the runs of the threads 12 in the opening 11 next to its intersection of the outmost end of such body to provide ratchet acting springy tines 18, which are bent at disrupted angles inwardly to the run of the remaining threads 12 integral with said body 10, as best seen in Figures 4 and 5 of the drawing, so that when the nut is worked home on the shank 14 these tines will automatically lock in selected notches 16 and thus lock the nut against retrograde movement with resultant loosening of the nut on the bolt or the like.

What is claimed is:

A nut adapted to be threaded on a threaded bolt, said nut comprising a body having an opening, threads in said opening whereby the nut may be shifted axially along said bolt, a predetermined number of said threads having their ends free and defining spring tines, said spring tines extending into said opening and being displaced away from said body, said spring tines adapted to engage the bolt whereby rotation of the nut in one direction upon the bolt is unimpeded but rotation of the nut in a reverse direction is yieldingly resisted by said spring tines.

AARON C. SAMPLE.

REFERENCES CITED

The following references are of record in the file of this patent:

UNITED STATES PATENTS

| Number | Name | Date |
|---|---|---|
| 1,364,553 | Hilsabeck | Jan. 4, 1921 |
| 1,554,338 | Duckett | Sept. 22, 1925 |
| 2,106,669 | Thornton | Jan. 25, 1938 |